United States Patent
Samuelsson et al.

(10) Patent No.: US 9,277,219 B2
(45) Date of Patent: Mar. 1, 2016

(54) ENCODER AND DECODER AND METHODS THEREOF FOR ENCODING/DECODING A PICTURE OF A VIDEO SEQUENCE

(71) Applicants: Jonatan Samuelsson, Stockholm (SE); Rickard Sjöberg, Stockholm (SE)

(72) Inventors: Jonatan Samuelsson, Stockholm (SE); Rickard Sjöberg, Stockholm (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 656 days.

(21) Appl. No.: 13/643,688

(22) PCT Filed: Oct. 23, 2012

(86) PCT No.: PCT/SE2012/051140
§ 371 (c)(1),
(2) Date: Nov. 16, 2012

(87) PCT Pub. No.: WO2013/062470
PCT Pub. Date: May 2, 2013

(65) Prior Publication Data
US 2014/0079119 A1   Mar. 20, 2014

Related U.S. Application Data

(60) Provisional application No. 61/550,646, filed on Oct. 24, 2011.

(51) Int. Cl.
| | |
|---|---|
| *H04N 7/12* | (2006.01) |
| *H04N 11/02* | (2006.01) |
| *H04N 11/04* | (2006.01) |
| *H04N 19/50* | (2014.01) |
| *H04N 19/70* | (2014.01) |
| *H04N 19/44* | (2014.01) |
| *H04N 19/423* | (2014.01) |

(52) U.S. Cl.
CPC ....... *H04N 19/00569* (2013.01); *H04N 19/423* (2014.11); *H04N 19/44* (2014.11); *H04N 19/50* (2014.11); *H04N 19/70* (2014.11)

(58) Field of Classification Search
CPC . H04N 19/50; H04N 19/00569; H04N 19/44; H04N 19/70; H04N 19/423; H04N 19/00533
See application file for complete search history.

(56) References Cited

U.S. PATENT DOCUMENTS

2013/0094585 A1 *   4/2013   Misra et al. ............. 375/240.16

OTHER PUBLICATIONS

Sjöberg, R. et al., "AHG21: Long-term pictures and pruning of reference picture sets", Joint Collaborative Team on Video Coding (JCT-VC) of ITU-T SG16 WP3 and ISO/IEC JTC1/SC29/WG11, 7th Meeting, Nov. 21, 2011, pp. 1-3, Document: JCTVC-G637, m22204, Geneva, Switzerland.

(Continued)

*Primary Examiner* — Sath V Perungavoor
*Assistant Examiner* — Xiaolan Xu
(74) *Attorney, Agent, or Firm* — Coats & Bennett, PLLC

(57) ABSTRACT

An object of the embodiments is to achieve an improved reference picture handling. That is achieved by taking into account whether the reference pictures in the decoded picture buffer are long-term reference pictures or short-term reference pictures when determining how they should be marked when the information of the reference picture set is received. The reference pictures are marked as "used for short-term reference" or "used for long-term reference" in the Decoded Picture Buffer (DPB) depending on whether they are included as short-term pictures or long-term pictures in the RPS of a current picture.

9 Claims, 5 Drawing Sheets

(56) References Cited

OTHER PUBLICATIONS

Sjöberg, R. et al., "Absolute signaling of reference pictures", Joint Collaborative Team on Video Coding (JCT-VC) of ITU-T SG16 WP3 and ISO/IEC JTC1/SC29/WG11, 6th Meeting, Jul. 14, 2011, pp. 1-10, Document: JCTVC-F493, WG11 No. m20923, Torino, Italy.

Bross B., et al., "WD4: Working Draft 4 of High-Efficiency Video Coding", Joint Collaborative Team on Video Coding (JCT-VC) of ITU-T SG16 WP3 and ISO/IEC JTC1/SC29/WG11, 6th Meeting, Jul. 14, 2011, pp. 1-215, Document: JCTVC-F803_d0, Torino, Italy.

* cited by examiner

ENCODER AND DECODER AND METHODS THEREOF FOR ENCODING/DECODING A PICTURE OF A VIDEO SEQUENCE

TECHNICAL FIELD

The embodiments of the present invention relates to a decoder and an encoder and methods thereof for managing reference pictures to be used for decoding an encoded representation of a picture of a video sequence.

BACKGROUND

High Efficiency Video Coding (HEVC) is a new video coding standard currently being developed in Joint Collaborative Team-Video Coding (JCT-VC). JCT-VC is a collaborative project between Moving Picture Experts Group (MPEG) and International Telecommunication Union-Telecommunication Standardization Sector (ITU-T). Currently, an HEVC Model (HM) is defined that includes a number of new tools and is considerably more efficient than H.264/Advanced Video Coding (AVC).

A picture in HEVC is partitioned into one or more slices, where each slice is an independently decodable segment of the picture. This means that if a slice is missing, for instance got lost during transmission, the other slices of that picture can still be decoded correctly. In order to make slices independent, they do not depend on each other. No bitstream element of another slice of the same picture is required for decoding any element of a particular slice.

Each slice contains a slice header which independently provides all required data for the slice to be independently decodable. One example of a data element present in the slice header is the slice address, which is used for the decoder to know the spatial location of the slice. Another example is the Buffer Description also referred to as Reference Picture Set which contains information of which reference pictures to be used when decoding a picture. However, these are only examples of data elements in the slice header.

HEVC has mechanisms for handling reference pictures. The reference pictures are previously decoded pictures to be used for decoding of a current picture. A decoded picture buffer (DPB) contains pictures decoded by the decoder. A reference picture in HEVC is a picture in the decoded picture buffer (DPB) that is available for reference by being marked "used for reference". There may also be pictures in the DPB that are marked "unused for reference", these pictures are not available for reference and are not reference pictures.

HEVC uses absolute signaling of reference pictures. The absolute signaling is realized by signaling what reference pictures to keep at the decoder. The signalling is done in a Buffer Description also referred to as Reference Picture Set (RPS), for each picture explicitly or by using a reference to a Sequence Parameter Set (SPS). The RPS also contains an indication of which pictures can be used for reference by the current picture. Reference pictures indicated to be used by the current picture are included in reference picture lists in the decoder. The reference picture lists are then used in the decoding process of the current slice of the current picture.

Each reference picture in the RPS is either identified as a short-term picture or as a long-term picture. The information if it is a short-term or a long-term reference picture is signaled in the RPS by sending two separate sets, one with all short-term reference pictures and one with all long-term reference pictures. An alternative design would be to send a single list and for each element indicate with a flag if it is a long-term reference picture or a short-term reference picture.

Picture Order Count (POC) is used in HEVC to define the output order (or display order) of pictures and also to identify reference pictures. Syntax elements used to derive the POC is signaled for each reference picture in the RPS. For short-term reference pictures the values of POC in the RPS must be identical to the values of POC signaled in the slice header of the reference picture to which the values of the POC in the RPS are referring. For long-term reference pictures there are two options; either the values of POC in the RPS are identical to the values of POC signaled in the slice header of the reference picture to which the values of the POC in the RPS are referring or the values of POC in the RPS are a shorter representation of to the values of POC signaled in the slice header (a.k.a. the least significant bits of the picture order count value or the POC_LSB) of the reference picture to which the values of the POC in the RPS are referring such that the reference pictures are uniquely identifiable. The latter is only allowed when there is only one picture in the DPB with a specific POC_LSB. For long-term reference pictures the term "corresponds to" is used to denote the identification of a reference picture using any of the two above mentioned options.

When buffer descriptions were originally proposed for inclusion in HEVC, the proposal included a marking process performed so that reference pictures that are in the DPB but not included in the RPS are marked as "unused for reference" prior to decoding of the current picture. The output process is also performed prior to the decoding of the current picture.

SUMMARY

An object of the embodiments is to achieve an improved reference picture handling. That is achieved by taking into account whether the reference pictures in the decoded picture buffer are long-term reference pictures or short-term reference pictures when determining how they should be marked when the information of the reference picture set is received. The reference pictures are marked as "used for short-term reference" or "used for long-term reference" in the Decoded Picture Buffer (DPB) depending on whether they are included as short-term pictures or long-term pictures in the RPS of a current picture.

According to a first aspect according to embodiments, a method performed by a decoder for managing reference pictures to be used for decoding an encoded representation of a picture of a video sequence is provided. In the method, a reference picture set received from an encoder is decoded, wherein the reference picture set comprises information of the reference pictures to be kept in a decoded picture buffer. A POC value indicated in the reference picture set is decoded and it is determined if the POC value indicated in the reference picture set corresponds to a short-term reference picture or a long-term reference picture. If the POC value indicated in the reference picture set corresponds to a long-term reference picture:

if there is a long-term reference picture in the decoded picture buffer with a POC value corresponding to the POC value indicated in the reference picture set, keeping the long-term reference picture in a decoded picture buffer as a long-term reference picture, if there is a short-term reference picture in the decoded picture buffer with a POC value corresponding to the POC value indicated in the reference picture set, marking the short-term reference picture in the decoded picture buffer as a long-term reference picture and keeping it in decoded picture buffer, if the POC value indicated in the reference picture set corresponds to a short-term reference picture:

if there is a short-term reference picture in the decoded picture buffer with a POC value corresponding to the POC value indicated in the reference picture set, keeping the short-term reference picture in the decoded picture buffer as a short-term reference picture.

According to a second aspect according to embodiments, a decoder for managing reference pictures to be used for decoding an encoded representation of a picture of a video sequence is provided. The decoder is configured to decode a reference picture set received from an encoder, wherein the reference picture set comprises information of the reference pictures to be kept in a decoded picture buffer and to decode a POC value indicated in the reference picture set. The decoder comprises a processor configured to determine if the POC value indicated in the reference picture set corresponds to a short-term reference picture or a long-term reference picture. Further, the processor is configured, when there is a long-term reference picture in the decoded picture buffer with a POC value corresponding to the POC value indicated in the reference picture set and when the POC value indicated in the reference picture set corresponds to a long-term reference picture, to keep the long-term reference picture in a decoded picture buffer as a long-term reference picture, the processor is further configured, when there is a short-term reference picture in the decoded picture buffer with a POC value corresponding to the POC value indicated in the reference picture set and when the POC value indicated in the reference picture set corresponds to a long-term reference picture, to mark the short-term reference picture in the decoded picture buffer as a long-term reference picture and keeping it in decoded picture buffer. The processor is further configured, when there is a short-term reference picture in the decoded picture buffer with a POC value corresponding to the POC value indicated in the reference picture set and when the POC value indicated in the reference picture set corresponds to a short-term reference picture, to keep the short-term reference picture in the decoded picture buffer as a short-term reference picture.

According to a third aspect according to embodiments, a method performed by an encoder for managing reference pictures to be used for encoding an encoded representation of a picture of a video sequence is provided. In the method, a POC value is assigned wherein the POC value is selected such that a decoder can perform the following steps:
  decoding a reference picture set received from an encoder, wherein the reference picture set comprises information of the reference pictures to be kept in a decoded picture buffer;
  decoding a Picture Order Count, POC, value indicated in the reference picture set and
  determining if the POC value indicated in the reference picture set corresponds to a short-term reference picture or a long-term reference picture,
if the POC value indicated in the reference picture set corresponds to a long-term reference picture:
if there is a long-term reference picture in the decoded picture buffer with a POC value corresponding to the POC value indicated in the reference picture set, keeping the long-term reference picture in a decoded picture buffer as a long-term reference picture,
if there is a short-term reference picture in the decoded picture buffer with a POC value corresponding to the POC value indicated in the reference picture set, marking the short-term reference picture in the decoded picture buffer as a long-term reference picture and keeping it in decoded picture buffer,
if the POC value indicated in the reference picture set corresponds to a short-term reference picture:
if there is a short-term reference picture in the decoded picture buffer with a POC value corresponding to the POC value indicated in the reference picture set, keeping the short-term reference picture in the decoded picture buffer as a short-term reference picture and
  including the assigned POC value in a reference picture set to be sent to a decoder, wherein the reference picture set comprises information of the reference pictures to be kept in a decoded picture buffer of the decoder.

According to a fourth aspect according to embodiments, an encoder for managing reference pictures to be used for encoding an encoded representation of a picture of a video sequence is provided. The encoder comprises a processor for assigning a POC value wherein the POC value is selected such that a decoder can perform the following steps
  decoding a reference picture set received from an encoder, wherein the reference picture set comprises information of the reference pictures to be kept in a decoded picture buffer;
  decoding a POC value indicated in the reference picture set and
  determining if the POC value indicated in the reference picture set corresponds to a short-term reference picture or a long-term reference picture,
if the POC value indicated in the reference picture set corresponds to a long-term reference picture:
if there is a long-term reference picture in the decoded picture buffer with a POC value corresponding to the POC value indicated in the reference picture set, keeping (206) the long-term reference picture in a decoded picture buffer as a long-term reference picture,
if there is a short-term reference picture in the decoded picture buffer with a POC value corresponding to the POC value indicated in the reference picture set, marking (207) the short-term reference picture in the decoded picture buffer as a long-term reference picture and keeping it in decoded picture buffer,
if the POC value indicated in the reference picture set corresponds to a short-term reference picture:
if there is a short-term reference picture in the decoded picture buffer with a POC value corresponding to the POC value indicated in the reference picture set, keeping (208) the short-term reference picture in the decoded picture buffer as a short-term reference picture.
and the processor is further configured to include the assigned POC value in a reference picture set to be sent to a decoder, wherein the reference picture set comprises information of the reference pictures to be kept in a decoded picture buffer of the decoder.

An advantage with the embodiments is that the taking into account whether the reference pictures in the decoded picture buffer are long-term reference pictures or short-term reference pictures when performing the picture marking process improves possibilities for detecting erroneous bitstream which is thus useful for example for error detection in error prone networks.

DETAILED DESCRIPTION

Figure 1:
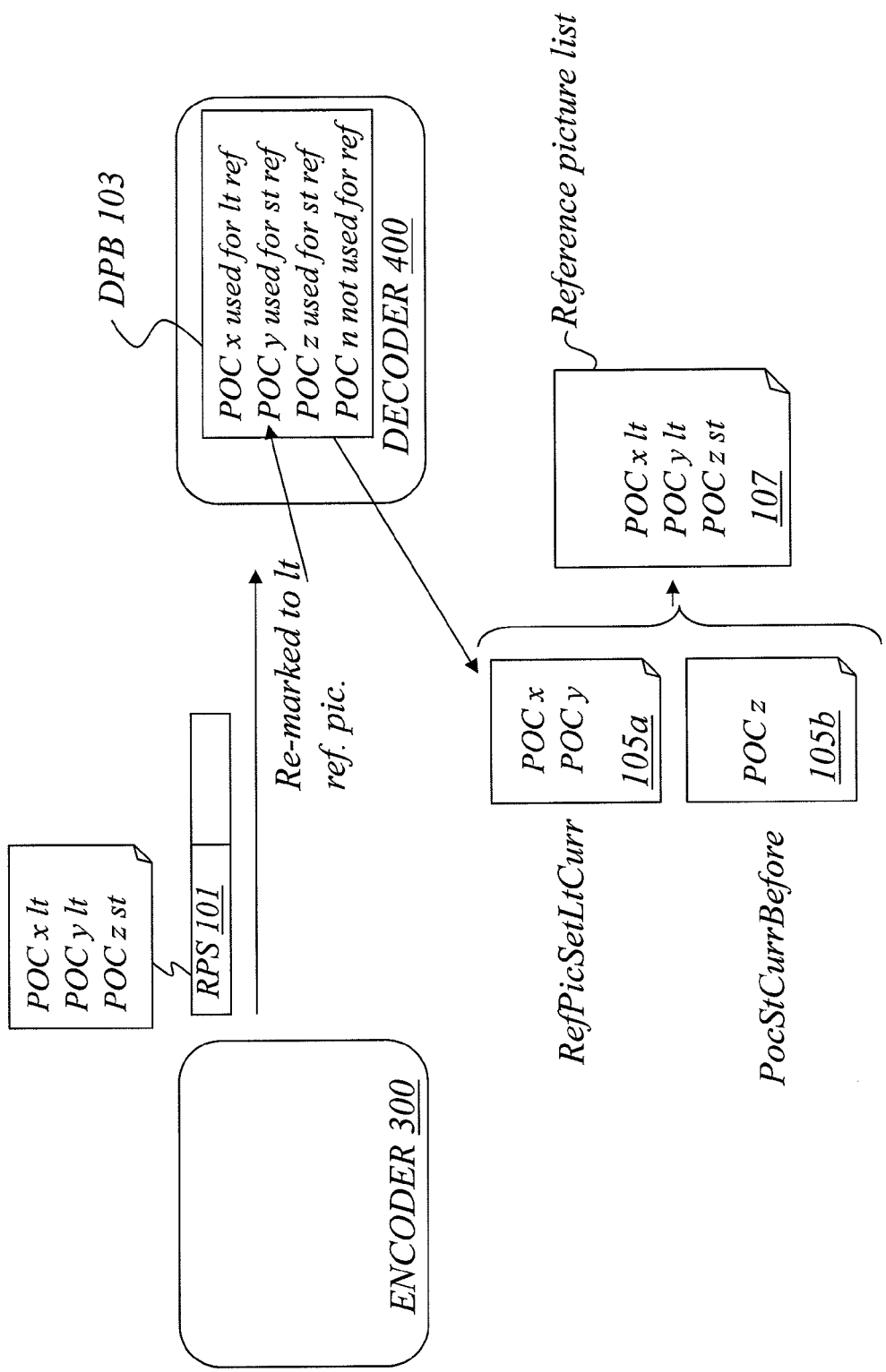
FIG. 1 illustrates schematically reference picture handling according to embodiments of the present invention.

With reference to FIG. 1, the encoder 300 informs the decoder 400 about which reference pictures to use for decoding of a particular picture by including the POCs of the reference pictures in the reference picture set (RPS) 101. The RPS is sent for each picture either in the slice header for the particular picture or in other control information. The decoder 400 stores decoded pictures in a decoded picture buffer (DPB) 103 and marks the pictures of the DPB as either used for reference or as not used for reference. In HEVC, the marking is performed before decoding of a current picture.

The reference pictures are included in the RPS 101 either as short-term (st) reference pictures or long-term (lt) reference pictures and according to the embodiments there is a restriction that pictures that once have been included in the RPS as long-term pictures can not later be included as, or be converted to, short-term pictures in the DPB. Thus, the reference pictures are marked as "used for short-term reference" or "used for long-term reference" in the Decoded Picture Buffer (DPB) depending on whether they are included as short-term pictures or long-term pictures in the RPS of a current picture.

The POCs of the respective pictures in the DPB marked as used for reference are inserted into reference picture lists 105a, 105b e.g. denoted RefPicSetLtCurr, RefPicSetLtFoll, RefPicSetStCurrBefore, RefPicSetStCurrAfter or RefPicSetStFoll. The POCs of the long-term reference pictures are inserted in RefPicSetLtCurr or RefPicSetLtFoll and the POCs of the short-term reference pictures are inserted in RefPicSetStCurrBefore, RefPicSetStCurrAfter or RefPicSetStFoll.

From the POCs of the reference pictures in those lists 105a, 105b, the decoder 400 constructs the final reference picture lists 107 which contains the POCs of the reference pictures that should be used by the decoder for decoding. This procedure according to the embodiments is illustrated by the following example.

In addition, it should be noted that although the embodiments are explained in the context of the decoder, the embodiments also apply to the encoder, since the encoder mimics the decoder behavior to ensure that decoded pictures are created exactly as they should. The encoder decides which POC values to assign to each picture it encodes and it decides which old pictures that it wants to keep as reference pictures and which pictures that should be short-term and which that should be long-term. While saying that, the encoder is bound to old decisions, if a picture is marked as long-term earlier, it can not be re-marked as short-term, pictures that are marked unused for reference can not be used for reference in any future picture and so on.

Figure 5:
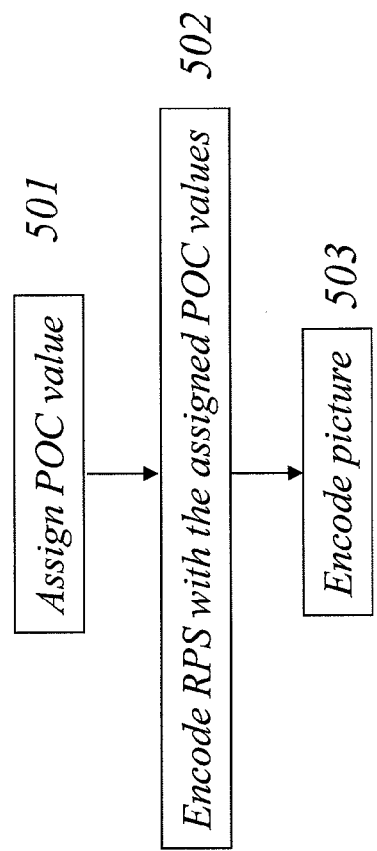
FIG. 5 is a flowchart illustrating the method in an encoder according to an embodiment of the present invention.

In the encoder the following steps are performed which is illustrated in the flowchart of FIG. 5:
501. The encoder selects the POC for the current picture. Thus, the encoder selects what POC value to signal to the decoder to identify the current picture. The encoder may select any POC value as long at is does not make the bitstream conflict with any bitstream requirement such as POC shall represent output order. That implies that the POC value must be assigned by the encoder such that the decoder can behave according to the embodiments of the present invention. In addition to the POC, the encoder also sends RPS syntax to the decoder to control what reference pictures to use and which ones should be short-term and which should be long-term.
502. The encoder encodes an RPS including the POCs of all short-term reference pictures and long-term reference pictures that are used by the current picture or may be used by pictures following the current picture.
503. The picture is encoded using the reference pictures indicated by the RPS.

Accordingly an encoder for managing reference pictures to be used for encoding an encoded representation of a picture of a video sequence is provided. The encoder comprises a processor for assigning a POC value such that a decoder can perform the following steps
  decoding 201 a reference picture set received from an encoder, wherein the reference picture set comprises information of the reference pictures to be kept in a decoded picture buffer:
    decoding 202 a Picture Order Count, POC, value indicated in the reference picture set and
    determining 203 if the POC value indicated in the reference picture set corresponds to a short-term reference picture or a long-term reference picture,
  if the POC value indicated in the reference picture set corresponds to a long-term reference picture:
    keeping 206 a long-term reference picture in a decoded picture buffer as a long-term reference picture if there is a long-term reference picture in the decoded picture buffer with a POC value corresponding to the POC value indicated in the reference picture set,
    marking 207 a short-term reference picture in the decoded picture buffer as a long-term reference picture and keeping it in decoded picture buffer if there is a short-term reference picture in the decoded picture buffer with a POC value corresponding to the POC value indicated in the reference picture set,
  if the POC value indicated in the reference picture set corresponds to a short-term reference picture:
    keeping 208 a short-term reference picture in the decoded picture buffer as a short-term reference picture if there is a short-term reference picture in the decoded picture buffer with a POC value corresponding to the POC value indicated in the reference picture set, and the processor is further configured to include the assigned POC value in a reference picture set to be sent to a decoder, wherein the reference picture set comprises information of the reference pictures to be kept in a decoded picture buffer of the decoder.

In the decoder the following steps are performed according to embodiments of the present invention:
1. Turning now to the flowchart of FIG. 2, the decoder receives a current picture and the RPS for that picture e.g. in the slice header and decodes the RPS 201 of the current picture before decoding the picture. It is preferred that the long-term reference pictures in the DPB are handled before the short-term reference pictures to mark the reference pictures in the DPB in order to avoid that one reference picture is included in the reference picture list as both a short-term and a long-term reference picture.
2. The POC of each reference picture of the RPS is decoded 202 and the following steps are performed:
a) If the POC of the reference picture is included in the RPS as a long-term reference picture 203 with POC y and there is a reference picture with that POC y in the DPB marked as "used for long-term reference" 205 that picture is kept 206 in the DPB marked as "used for long-term reference".
b) If POC of the reference picture is in included in the RPS as a long-term reference picture 203 and there is a picture with that POC in the DPB marked as "used for short-term reference" 205 that picture is kept in the DPB but remarked as "used for long-term reference" 207. According to an embodiment, step 206 (keeping a long-term reference picture in a decoded picture buffer as a long-term reference picture if there is a long-term reference picture in the decoded picture buffer with a POC value equal to the POC value indicated in the reference picture set) is performed before step 207 (marking a short-term reference picture in the decoded picture buffer as a long-term reference picture and keeping it in decoded picture buffer if there is a short-term reference picture in the decoded picture buffer with a POC value equal to the POC value indicated in the reference picture set). I.e. step 206 is performed and if the condition of step 206 is not fulfilled, step 207 is performed.

I.e. if(there is a long-term reference picture picX in the DPB
   with pic_order_cnt_lsb equal to PocLtCurr[i])
RefPicSetLtCurr[i]=picX
else if(there is a short-term reference picture picY in the DPB
   with pic_order_cnt_lsb equal to PocLtCurr[i])
RefPicSetLtCurr[i]=picY
Wherein the pic_order_cntlsb is the POC value and PocLtCurr[i] is a list of long-term reference pictures in the RPS and the RefPicSetLtCurr[i] is a reference picture list containing long-term reference pictures.

c) Otherwise, if the POC of the reference picture is included in the RPS as a short-term reference picture 203 and if there is a picture with that POC in the DPB marked as "used for short-term reference" that picture is kept 208 in the DPB marked as "used for short-term reference".

I.e., for(i=0; i<NumPocStCurrBefore; i++)
  if(there is a short-term reference picture picX in the DPB
    with PicOrderCntVal equal to PocStCurrBefore[i])
  RefPicSetStCurrBefore[i]=picX
  else
    RefPicSetStCurrBefore[i]="no reference picture"
Wherein the PicOrderCntVal is the POC value and PocStCurrBefore[i] is a list of long-term reference pictures in the RPS and the RefPicSetStCurrBefore[i] is a reference picture list containing short-term reference pictures.

All reference pictures included in RefPicSetStCurrBefore, RefPicSetStCurrAfter and RefPicSetStFoll are already marked as "used for short-term reference".

3. All pictures in the DPB that are not included the RPS are marked as "unused for reference". I.e. all reference pictures in the decoded picture buffer that are not included in RefPicSetLtCurr, RefPicSetLtFoll, RefPicSetStCurrBefore, RefPicSetStCurrAfter or RefPicSetStFoll are marked as "unused for reference".

4. A reference picture list is created at the decoder which contains the reference pictures from the RefPicSetLtCurr, RefPicSetLtFoll, RefPicSetStCurrBefore, RefPicSetStCurrAfter or RefPicSetStFoll. The current picture is decoded using the reference pictures of the reference picture list.

Another way to formulate the steps performed in the decoder according to the embodiments is:

1. The decoder decodes the RPS of the current picture (before decoding the picture)

2. If there is a long-term reference picture signaled in the RPS with POC=X and there is no picture in the DPB marked as "used for long-term reference" with POC=X and there is a picture with POC=X in the DPB marked "used for short-term reference" that picture is marked as "used for long-term reference".

3. All POCs of the pictures in the DPB that are not included the RPS are marked as "unused for reference".

4. The current picture is decoded.

5. The current picture is marked as "used for short-term reference", Hence each decoded picture is marked as a short-term reference picture immediately after it is decoded. If the decoded picture should be a long-term reference picture, it should be marked as a long-term reference picture in the very next picture. The picture will then never actually be used as short-term since marking (in this case marking to long-term) takes place before actual picture decoding of the next picture.

The POCs of the pictures that are in the RPS but have no corresponding picture in the DPB marked as "used for short-term reference" or "used for long-term reference" may be inferred as lost pictures depending on other syntax elements i.e. the used_by_curr_pic flag.

Figure 2:
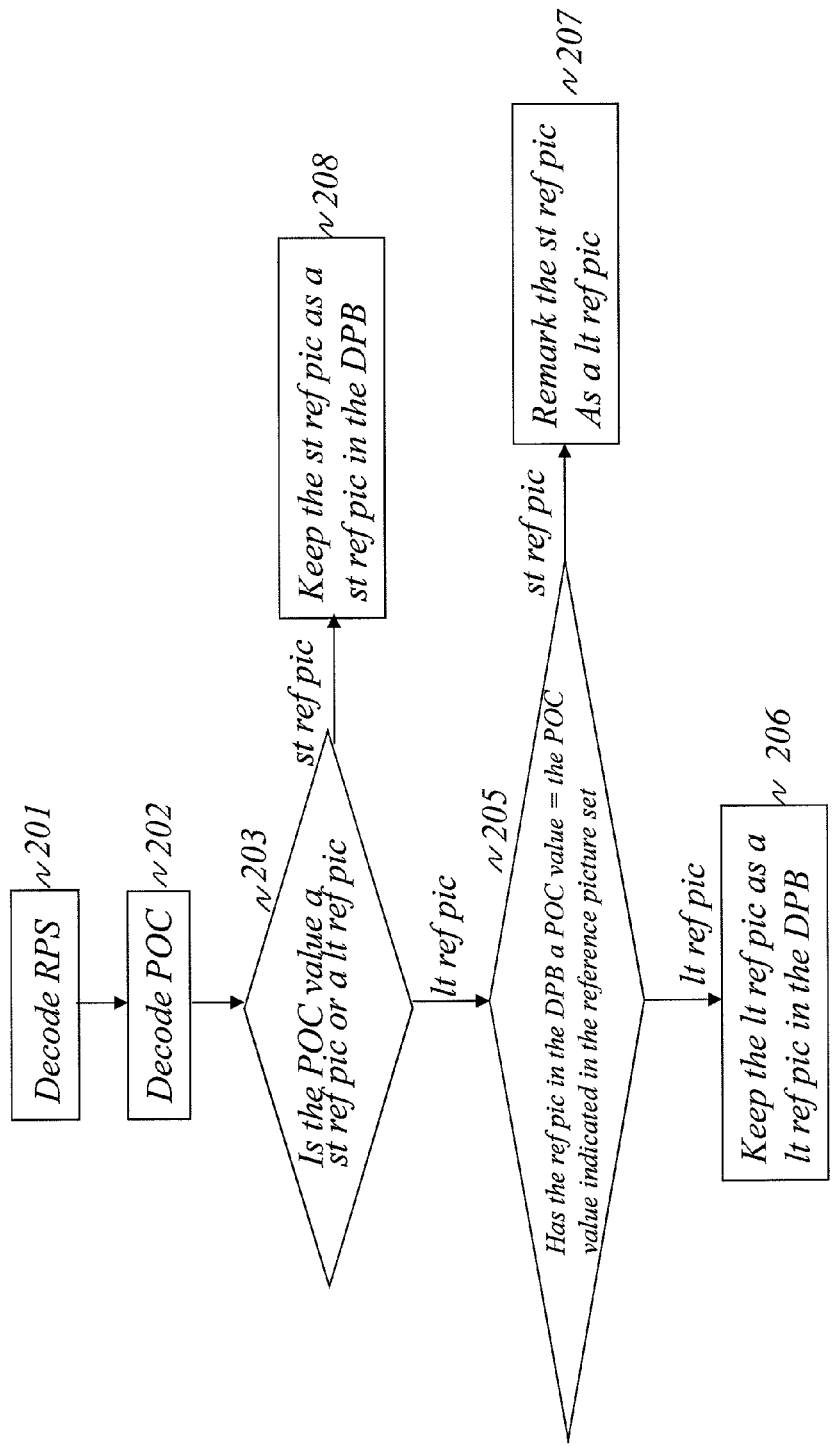
FIG. 2 is a flowchart illustrating the method in a decoder according to an embodiment of the present invention.

As illustrated in the flowchart of FIG. 2, a method performed by a decoder for managing reference pictures to be used for decoding an encoded representation of a picture of a video sequence bitstream is provided according to an embodiment.

A reference picture set received from an encoder is decoded 201, wherein the reference picture set comprises information of the reference pictures to be kept in a decoded picture buffer. A POC value indicated in the reference picture set is decoded 202 and it is determined 203 if the POC value indicated in the reference picture set corresponds to a short-term reference picture or a long-term reference picture. If the POC value indicated in the reference picture set corresponds to a long-term reference picture, 203 a long-term reference picture is kept 206 in a decoded picture buffer as a long-term reference picture if there is a long-term reference picture in the decoded picture buffer 205 with a POC value corresponding to the POC value indicated in the reference picture set.

If the POC value indicated in the reference picture set corresponds to a long-term reference picture 203, a short-term reference picture is marked 207 in the decoded picture buffer as a long-term reference picture and kept in the decoded picture buffer if there is a short-term reference picture in the decoded picture buffer 205 with a POC value corresponding to the POC value indicated in the reference picture set, If the POC value indicated in the reference picture set corresponds to a short-term reference picture, 203 a short-term reference picture is kept 208 in the decoded picture buffer as a short-term reference picture if there is a short-term reference picture in the decoded picture buffer with a POC value corresponding to the POC value indicated in the reference picture set.

Long-term reference pictures and short-term reference pictures are the same kind of pictures with the only difference that they are marked differently in the DPB; "used for long-term reference" and "used for short-term reference", correspondingly. The reason to have this marking is 1) to be able to signal them more efficiently (short-term pictures can be encoded with variable length codes while long-term ref pictures can be encoded with fixed length codes).

2) to handle them differently in the decoding process (e.g. motion vectors from short-term pictures may be scaled in motion vector scaling while motion vectors from long-term pictures are not).

There does not have to be a distinct difference in POC steps between short-term and long-term, i.e. can be as close to the current picture as 1 POC step away. However one alternative is to determine that long term pictures must have negative DiffPOC compared to the current picture i.e. precede it in output order.

The methods according to the embodiments can be implemented by a computer program product encoded with computer program code means which, when loaded and executed by a processor, cause performance of the method according to the embodiments.

A computer readable storage medium encoded with instructions which, when loaded and executed by a processor, cause performance of the method according to the embodiments is also provided.

In one alternative there is a restriction that reference pictures that have been in the DPB for more than a specific period of time, which preferably is expressed in POC-steps, must be signaled as long-term pictures in the Buffer Descriptions.

In one alternative there is a restriction that reference pictures that have been displayed (outputted) can not be included as short-term reference pictures in a Buffer Description of a current picture if their DiffPOC( ) compared to the current picture is positive.

In one alternative there is a syntax element, e.g. a flag or an id, sent for each picture e.g. in the slice header to indicate if the current picture can be used as a long term picture or not. Preferably there is a restriction that a picture A can only indicate that it may be used for long-term reference if there is no long-term reference picture in the DPB with the same POC when A is decoded. In another alternative, the reference picture list construction allows for two pictures with the same POC, where one picture is a long-term picture and the other picture is a short term picture. It is preferred that short-term pictures comes before long-term pictures in the reference picture list.

The embodiments of the invention may be applied to any suitable video codec comprising the encoder and/or the decoder according to the embodiments.

As mentioned above, the mechanisms described above are done both in the encoder as well as in the decoder. The encoder and the decoder, respectively, comprises a processor configured to perform the functions according to the above described embodiments. Further the encoder and the decoder, respectively comprises a memory for storing e.g. RPS, decoded pictures, and other picture information such as reference pictures in reference picture lists. The memory may also comprise instructions to be executed on the processor such that the processor can perform the steps according to the embodiments.

Figure 3:
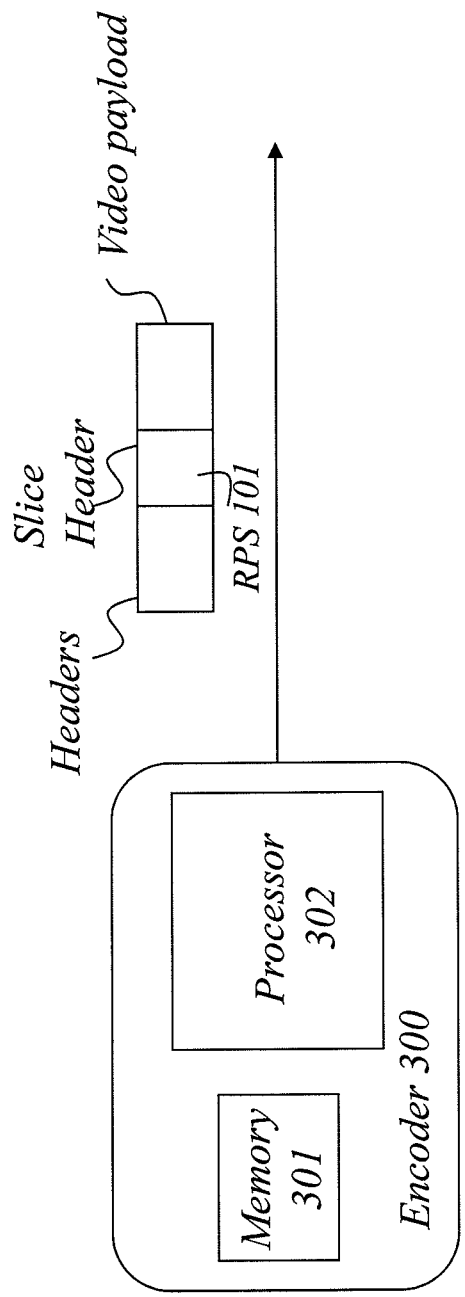
FIG. 3 illustrates an encoder in the context of the embodiments of the present invention.

FIG. 3 schematically illustrates an encoder in the context of the embodiments of the present invention.

Accordingly an encoder, comprising one or more processors and e.g. one or more memories, is configured to carry out the methods according to the embodiments is provided.

FIG. 3 is a schematic diagram showing some components of the encoder 300. The encoder comprises a processor 302. The processor 302 could be any combination of one or more of a suitable central processing unit (CPU), multiprocessor, microcontroller, digital signal processor (DSP), application specific integrated circuit (ASIC) etc., capable of executing software instructions contained in a computer program stored in one or more memories 301.

Thus an encoder 300 configured to encode a representation of a current picture of a video sequence of multiple pictures using reference pictures is illustrated in FIG. 3. The encoder comprises a processor 302 configured to assign a POC value for the current picture, wherein the POC value is assigned such that the decoder can perform the method according to the embodiments of the present invention. The processor 302 is configured to include the assigned POC value in a reference picture set to be sent to a decoder, wherein the reference picture set comprises information of the reference pictures to be kept in a decoded picture buffer of the decoder. Hence, the encoder is configured to encode an RPS including all short-term reference pictures and long-term reference pictures that are used by the current picture or may be used by pictures following the current picture and to encode the current picture using all or a subset of the reference pictures included in the RPS.

Figure 4:
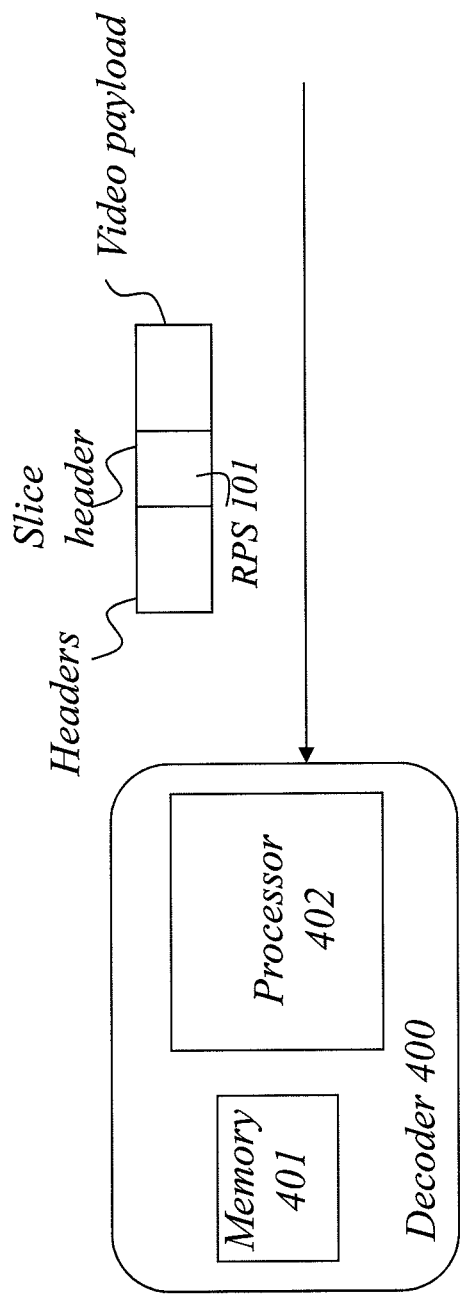
FIG. 4 illustrates a decoder according to the embodiments of the present invention.

FIG. 4 schematically illustrates a decoder according to an embodiment of the present invention.

Accordingly a decoder, comprising one or more processors and e.g. one or more memories, is configured to carry out the methods according to the embodiments is provided.

FIG. 4 is a schematic diagram showing some components of the decoder 400. The decoder comprises a processor 402. The processor 402 could be any combination of one or more of a suitable central processing unit (CPU), multiprocessor, microcontroller, digital signal processor (DSP), application specific integrated circuit (ASIC) etc., capable of executing software instructions contained in a computer program stored in one or more memories 401.

A decoder 400 for managing reference pictures to be used for decoding an encoded representation of a picture of a video sequence is provided according to one embodiment. The decoder is configured to decode a reference picture set received from an encoder, wherein the reference picture set comprises information of the reference pictures to be kept in a decoded picture buffer and to decode a POC value indicated in the reference picture set. The decoder comprises a processor 402 configured to determine if the POC value indicated in the reference picture set corresponds to a short-term reference picture or a long-term reference picture. The processor 402 is configured to keep a long-term reference picture in a decoded picture buffer as a long-term reference picture when there is a long-term reference picture in the decoded picture buffer with a POC value corresponding to the POC value indicated in the reference picture set and when the POC value indicated in the reference picture set corresponds to a long-term reference picture. The processor 402 is further configured to mark a short-term reference picture in the decoded picture buffer as a long-term reference picture and keeping it in decoded picture buffer when there is a short-term reference picture in the decoded picture buffer with a POC value corresponding to the POC value indicated in the reference picture set and when the POC value indicated in the reference picture set corresponds to a long-term reference picture. In addition, the processor 402 is further configured to keep a short-term reference picture in the decoded picture buffer as a short-term reference picture when there is a short-term reference picture in the decoded picture buffer with a POC value corresponding to the POC value indicated in the reference picture set and when the POC value indicated in the reference picture set corresponds to a short-term reference picture.

According to an embodiment the processor is configured to determine if the POC value indicated in the reference picture set corresponds to a short-term reference picture or a long-term reference picture by determining if the POC value indicated in the reference picture set is included in one of the lists PocLtCurr or PocLtFoll in which case the POC value corresponds to a long-term reference picture or if the POC value indicated in the reference picture set is included in one of the lists PocStCurrBefore, PocStCurrAfter or PocStFoll in which case the POC value corresponds to a short-term reference picture.

Moreover, the long-term reference pictures in the reference picture set may be handled before the short-term reference pictures to mark the reference pictures in the decoded picture buffer.

The encoder may be an HEVC encoder and the decoder may be an HEVC decoder, but the embodiments are not limited to HEVC. The encoder and the decoder, respectively may be implemented in a mobile device or in any type of video camera and/or display.

The invention claimed is:

1. A method, performed by a decoder, for managing reference pictures to be used for decoding an encoded representation of a picture of a video sequence, the method comprising:
   decoding a reference picture set received from an encoder, wherein the reference picture set comprises information about the reference pictures to be kept in a decoded picture buffer;
   decoding a Picture Order Count (POC) value indicated in the reference picture set;
   determining if the POC value indicated in the reference picture set corresponds to a short-term reference picture or a long-term reference picture;
   if the POC value indicated in the reference picture set corresponds to a long-term reference picture:
      if there is a long-term reference picture in the decoded picture buffer with a POC value corresponding to the POC value indicated in the reference picture set, keeping the long-term reference picture in the decoded picture buffer as a long-term reference picture;
      if there is a short-term reference picture in the decoded picture buffer with a POC value corresponding to the POC value indicated in the reference picture set and there is not a long-term reference picture in the decoded picture buffer with a POC value corresponding to the POC value indicated in the reference picture set, marking the short-term reference picture in the decoded picture buffer as a long-term reference picture and keeping it in the decoded picture buffer;
   if the POC value indicated in the reference picture set corresponds to a short-term reference picture:
      if there is a short-term reference picture in the decoded picture buffer with a POC value corresponding to the POC value indicated in the reference picture set, keeping the short-term reference picture in the decoded picture buffer as a short-term reference picture.

2. The method of claim 1, wherein determining if the POC value indicated in the reference picture set corresponds to a short-term reference picture or a long-term reference picture comprises determining if the POC value indicated in the reference picture set is included in one of the lists:
   PocLtCurr or PocLtFoll, in which case the POC value corresponds to a long-term reference picture; and
   PocStCurrBefore, PocStCurrAfter, or PocStFoll, in which case the POC value corresponds to a short-term reference picture.

3. The method of claim 1, further comprising marking the reference pictures in the decoded picture buffer by handling the long-term reference pictures in the reference picture set before the short-term reference pictures.

4. A computer program product stored in a non-transitory computer readable medium for managing reference pictures to be used for decoding an encoded representation of a picture of a video sequence, the computer program product comprising software instructions which, when run on a processor of a decoder, causes the processor to:
   decode a reference picture set received from an encoder, wherein the reference picture set comprises information about the reference pictures to be kept in a decoded picture buffer;
   decode a Picture Order Count (POC) value indicated in the reference picture set;
   determine if the POC value indicated in the reference picture set corresponds to a short-term reference picture or a long-term reference picture;
   if the POC value indicated in the reference picture set corresponds to a long-term reference picture:
      if there is a long-term reference picture in the decoded picture buffer with a POC value corresponding to the POC value indicated in the reference picture set, keep the long-term reference picture in a decoded picture buffer as a long-term reference picture;
      if there is a short-term reference picture in the decoded picture buffer with a POC value corresponding to the POC value indicated in the reference picture set and there is not a long-term reference picture in the decoded picture buffer with a POC value corresponding to the POC value indicated in the reference picture set, mark the short-term reference picture in the decoded picture buffer as a long-term reference picture and keeping it in decoded picture buffer;
   if the POC value indicated in the reference picture set corresponds to a short-term reference picture:
      if there is a short-term reference picture in the decoded picture buffer with a POC value corresponding to the POC value indicated in the reference picture set, keep the short-term reference picture in the decoded picture buffer as a short-term reference picture.

5. A decoder for managing reference pictures to be used for decoding an encoded representation of a picture of a video sequence, the decoder configured to decode a reference picture set received from an encoder, wherein the reference picture set comprises information of the reference pictures to be kept in a decoded picture buffer and to decode a Picture Order Count (POC) value indicated in the reference picture set, the decoder comprising a processor configured to:
   determine if the POC value indicated in the reference picture set corresponds to a short-term reference picture or a long-term reference picture;
   keep, when there is a long-term reference picture in the decoded picture buffer with a POC value corresponding to the POC value indicated in the reference picture set and the POC value indicated in the reference picture set corresponds to a long-term reference picture, the long-term reference picture in a decoded picture buffer as a long-term reference picture;
   mark, when there is a short-term reference picture in the decoded picture buffer with a POC value corresponding to the POC value indicated in the reference picture set and the POC value indicated in the reference picture set corresponds to a long-term reference picture and there is not a long-term reference picture in the decoded picture buffer with a POC value corresponding to the POC value indicated in the reference picture set, the short-term reference picture in the decoded picture buffer as a long-term reference picture and keeping it in decoded picture buffer;
   keep, when there is a short-term reference picture in the decoded picture buffer with a POC value corresponding to the POC value indicated in the reference picture set and the POC value indicated in the reference picture set corresponds to a short-term reference picture, the short-term reference picture in the decoded picture buffer as a short-term reference picture.

6. The decoder of claim 5, wherein the processor is configured to determine if the POC value indicated in the reference picture set corresponds to a short-term reference picture or a long-term reference picture by determining if the POC value indicated in the reference picture set is included in one of the lists:
PocLtCurr or PocLtFoll in which case the POC value corresponds to a long-term reference picture; and
PocStCurrBefore, PocStCurrAfter, or PocStFoll, in which case the POC value corresponds to a short-term reference picture.

7. The decoder of claim 5, wherein the processor is configured to mark the reference pictures in the decoded picture buffer by handling the long-term reference pictures in the reference picture set before the short-term reference pictures.

8. A method performed by an encoder for managing reference pictures to be used for encoding an encoded representation of a picture of a video sequence, the method comprising:
assigning a Picture Order Count (POC) value, wherein the POC value is selected such that a decoder can:
decode a reference picture set received from an encoder, wherein the reference picture set comprises information about the reference pictures to be kept in a decoded picture buffer of the decoder;
decode a POC value indicated in the reference picture set;
determine if the POC value indicated in the reference picture set corresponds to a short-term reference picture or a long-term reference picture;
if the POC value indicated in the reference picture set corresponds to a long-term reference picture:
if there is a long-term reference picture in the decoded picture buffer with a POC value corresponding to the POC value indicated in the reference picture set, keep the long-term reference picture in a decoded picture buffer as a long-term reference picture;
if there is a short-term reference picture in the decoded picture buffer with a POC value corresponding to the POC value indicated in the reference picture set and there is not a long-term reference picture in the decoded picture buffer with a POC value corresponding to the POC value indicated in the reference picture set, mark the short-term reference picture in the decoded picture buffer as a long-term reference picture and keeping it in decoded picture buffer;
if the POC value indicated in the reference picture set corresponds to a short-term reference picture:
if there is a short-term reference picture in the decoded picture buffer with a POC value corresponding to the POC value indicated in the reference picture set, keep the short-term reference picture in the decoded picture buffer as a short-term reference picture;
including the assigned POC value in a reference picture set to be sent to the decoder.

9. An encoder for managing reference pictures to be used for encoding an encoded representation of a picture of a video sequence, the encoder comprising a processor configured to:
assign a Picture Order Count (POC) value, wherein the POC value is selected such that a decoder can:
decode a reference picture set received from an encoder, wherein the reference picture set comprises information about the reference pictures to be kept in a decoded picture buffer of the decoder;
decode a POC value indicated in the reference picture set;
determine if the POC value indicated in the reference picture set corresponds to a short-term reference picture or a long-term reference picture;
if the POC value indicated in the reference picture set corresponds to a long-term reference picture:
if there is a long-term reference picture in the decoded picture buffer with a POC value corresponding to the POC value indicated in the reference picture set, keep the long-term reference picture in a decoded picture buffer as a long-term reference picture;
if there is a short-term reference picture in the decoded picture buffer with a POC value corresponding to the POC value indicated in the reference picture set and there is not a long-term reference picture in the decoded picture buffer with a POC value corresponding to the POC value indicated in the reference picture set, mark the short-term reference picture in the decoded picture buffer as a long-term reference picture and keeping it in decoded picture buffer;
if the POC value indicated in the reference picture set corresponds to a short-term reference picture:
if there is a short-term reference picture in the decoded picture buffer with a POC value corresponding to the POC value indicated in the reference picture set, keep the short-term reference picture in the decoded picture buffer as a short-term reference picture;
include the assigned POC value in a reference picture set to be sent to the decoder.

\* \* \* \* \*

UNITED STATES PATENT AND TRADEMARK OFFICE
CERTIFICATE OF CORRECTION

| | |
|---|---|
| PATENT NO. | : 9,277,219 B2 |
| APPLICATION NO. | : 13/643688 |
| DATED | : March 1, 2016 |
| INVENTOR(S) | : Samuelsson et al. |

Page 1 of 1

It is certified that error appears in the above-identified patent and that said Letters Patent is hereby corrected as shown below:

In the Specification

In Column 4, Line 44, delete "picture." and insert -- picture, --, therefor.

In Column 5, Line 60, delete "long at is" and insert -- long as it --, therefor.

In Column 7, Line 59, delete "picture)" and insert -- picture). --, therefor.

In Column 8, Line 41, delete "set," and insert -- set. --, therefor.

In Column 8, Line 53, delete "marking is" and insert -- marking is: --, therefor.

Signed and Sealed this
Twenty-first Day of June, 2016

Michelle K. Lee
*Director of the United States Patent and Trademark Office*